H. C. BABCOCK AND J. H. McCREARY.
TANDEM SOIL PULVERIZER AND PACKER.
APPLICATION FILED NOV. 3, 1919.
1,337,425.
Patented Apr. 20, 1920.
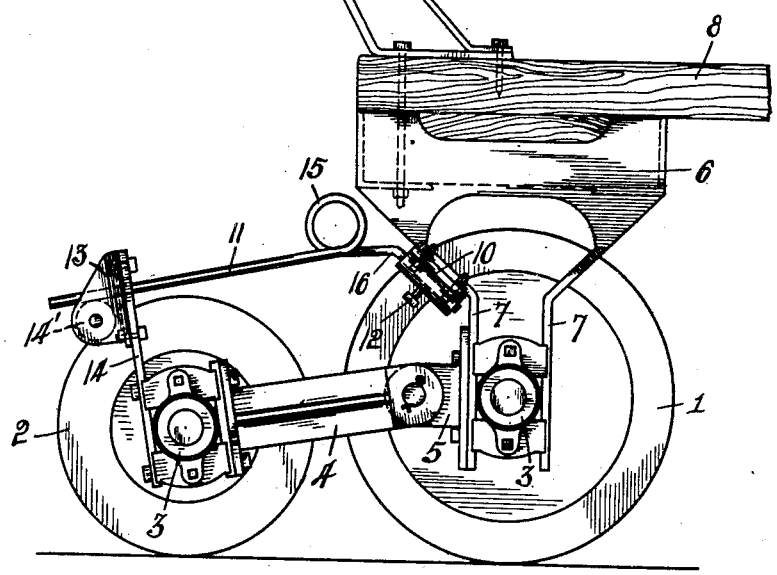
FIG-1-
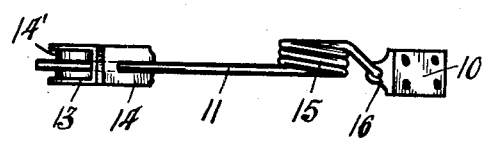
FIG-2-
INVENTOR
Harold C. Babcock, and
James H. McCreary,
By Owen Owen & Crampton,
Their attys.

UNITED STATES PATENT OFFICE.

HAROLD C. BABCOCK AND JAMES H. McCREARY, OF BOWLING GREEN, OHIO, ASSIGNORS TO THE THORNBURGH MANUFACTURING COMPANY, OF BOWLING GREEN, OHIO, A CORPORATION OF OHIO.

TANDEM SOIL PULVERIZER AND PACKER.

1,337,425.  Specification of Letters Patent.  Patented Apr. 20, 1920.

Application filed November 3, 1919. Serial No. 335,519.

*To all whom it may concern:*

Be it known that we, HAROLD C. BABCOCK and JAMES H. McCREARY, citizens of the United States, and residents of Bowling Green, in the county of Wood and State of Ohio, have invented a certain new and useful Tandem Soil Pulverizer and Packer; and we do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to agricultural machines and particularly to soil pulverizers and rollers of the tandem type.

In machines of this character the driver's seat is mounted on a frame supported by one of the rollers or pulverizer gangs of the machine so that the weight or pressure of the two rollers or gangs on the soil will vary as the weights of the different persons driving the machine vary, which is an objectionable feature.

The object of our invention is the provision in machines of the character described of regulable means for varying at will the downward pressure on the soil of the roller or pulverizer gang which is not subjected to the driver's weight, so that its pressure on the soil may be increased or diminished to equalize it with the pressure of the other roller or gang of the machine as the weights of the different drivers may require.

The invention is fully described in the following specification, and while, in its broader aspect, it is capable of embodiment in numerous forms, a preferred embodiment thereof is illustrated in the accompanying drawings, in which,—

Figure 1 is a side elevation of a machine embodying the invention, and Fig. 2 is a top plan view of the regulable pressure means embodying the invention with parts broken away.

Referring to the drawings, 1 and 2 designate, respectively, the front and rear rotatable soil packing and pulverizing units of a machine of the class described, which units may comprise gangs of rollers or pulverizers of disk or toothed wheel form, as well understood in the art. The shafts carrying the rollers or pulverizing disks are journaled at their ends in suitable bearing boxes 3 and the boxes or frames of the two gangs are connected together, in the present instance, by an arm 4 projecting forwardly from each bearing box 3 on the rear gang and pivotally connected for vertical swinging movements to an arm 5 projecting rearwardly from the adjacent bearing boxes to the front gang.

A frame 6 is mounted over one of the gangs, the front one in the present instance, being supported at its ends by a pair of uprights or standards at each end which are bolted to the sides and form parts of the respective journal boxes 3. A tongue 8 projects forward from the frame 6 and a seat 9 is mounted on the rear thereof in position for the weight of the driver thereon to serve as a counterbalance for the weight of the tongue.

In carrying out the feature of our invention, a bracket 10 is secured to the rear frame upright 7 at each end of the frame and this bracket, in the present instance, is provided vertically therethrough with a socket in which one end of a spring 11 is adapted to be inserted, the spring being secured therein by a set screw 12. The end of the spring 11 inserted in the socket of the bracket 10 is angled relative to the body portion of the spring 11 so that such body portion may project rearwardly from the bracket and through a bracket 13 carried at the upper end of an upright 14 that is bolted to and rises from the rear side of the journal box 3 of the rear gang 2. The bracket 13 carries a roller 14' therein upon the top of which the adjacent end of the spring 11 has a downward bearing, such roller being provided to reduce the friction between the spring 11 and bracket as they have relative movements upon a lowering of one roller or pulverizer gang relative to the other. The spring 11 is preferably provided with a coil 15 intermediate its ends and its tension or downward pressure on the rear gang is regulated by a raising or lowering of the end 16 thereof in the bracket 10. With the present construction it is apparent that an outward adjustment of the spring end 16 relative to the bracket 10 increases the effective length of the spring and accordingly reduces it tension.

The tension or pressure which the spring 11 exerts on the rear gang of the machine should be approximately such as to equal the downward pressure which is exerted on the front roller or disk gang by the combined weight of the frame and driver. Therefore if the driver is of less weight than that for which the spring 11 has been set or adjusted, the end 16 thereof is moved outward in the bracket 10 to reduce the tension of the spring on the rear gang an extent sufficient to suit the weight of the driver.

It is evident that the spring 11 in exerting a downward pressure on the rear gang 2 exerts a forward tilting pressure on the frame 6 and if the driver is not seated on the frame, the overbalancing weight of the tongue will cause or permit a forward tilting of the frame. The weight of the driver, however, is intended to counterbalance the forward tilting action of the tongue and to raise the tongue to substantially horizontal or usable position. If the weight of the driver is not sufficient to do this or is such as to overbalance the weight of the tongue and raise it above usable position, then the spring 11 should be adjusted so that the weight of the driver and tongue will counterbalance each other.

It will be understood that our invention is not limited to any specific construction, arrangement or form of the parts or to any particular type of pulverizer, as it is capable of numerous modifications and changes and to use in different machines of this character without departing from the spirit of the claims.

Having thus described our invention, what we claim as new and desire to secure by Letters Patent, is,—

1. The combination with a machine of the class described having a plurality of gangs of packing or pulverizing units connected in tandem for relative vertical movements, and a frame carried by and mounted over one of said units, of a bar form of spring connecting said frame and the other unit to exert a downward pressure on the latter and adjustable to vary such pressure.

2. In a machine of the class described, front and rear gangs of rotatable soil packing or pulverized units, bearing boxes for the shaft ends of said units, means connecting the bearing boxes of the units to cause a trailing of one from the other and to permit relative vertical movements thereof, a frame rising from and supported by the bearing boxes of one unit and carrying a driver's seat and tongue, a bracket arm carried by and rising from each bearing box of the other unit, a bar spring adjustably connected at one end to the frame to vary its effective length and having its other end movably coacting with said bracket arm to exert a downward pressure on the associated unit.

3. In a machine of the class described, front and rear gangs of rotatable soil packing or pulverizing units, bearing boxes for the shaft ends of said units, means connecting the bearing boxes of the units to cause a trailing of one from the other and to permit relative vertical movements thereof, a frame rising from and supported by the bearing boxes of one unit and carrying a driver's seat and tongue, a bracket arm carried by and rising from each bearing box of the other unit, a roller carried by said arm, a bracket carried by said frame, a bar spring having one end angled and adjustably carried by said bracket and having its other end slidably exerting a downward pressure on said roller and bracket arm, said spring having a coil intermediate its ends.

In testimony whereof, we have hereunto signed our names to this specification.

HAROLD C. BABCOCK.
JAMES H. McCREARY.